Sept. 29, 1931.  S. M. SWENSEN  1,825,430
MECHANICAL VIBRATOR
Filed Oct. 14, 1929  2 Sheets-Sheet 1

Inventor
Sigurd M. Swensen
By his Attorneys
Merchant and Kiewe

Sept. 29, 1931.  S. M. SWENSEN  1,825,430
MECHANICAL VIBRATOR
Filed Oct. 14, 1929   2 Sheets-Sheet 2

Inventor
Sigurd M. Swensen
By his Attorneys

Patented Sept. 29, 1931

1,825,430

UNITED STATES PATENT OFFICE

SIGURD M. SWENSEN, OF MINNEAPOLIS, MINNESOTA

MECHANICAL VIBRATOR

Application filed October 14, 1929. Serial No. 399,513.

My invention provides a novel and highly efficient mechanical vibrator. The term "mechanical vibrator" as herein used, refers to machines for subjecting the human body to vibratory motion and to massaging action for general and diverse improvement of the physical conditions. In such a machine, the vibration is produced largely by rapidity of vibratory motion while a massaging action is produced chiefly by the peculiar kind of vibratory motion imparted to the human body through the body-engaging devices which are usually straps or belts attached at their ends with the intermediate portion free for engagement with the body.

The invention is illustrated in the accompanying drawings, wherein like characters indicate like parts throughout the several views.

Referring to the drawings.

Figure 1:
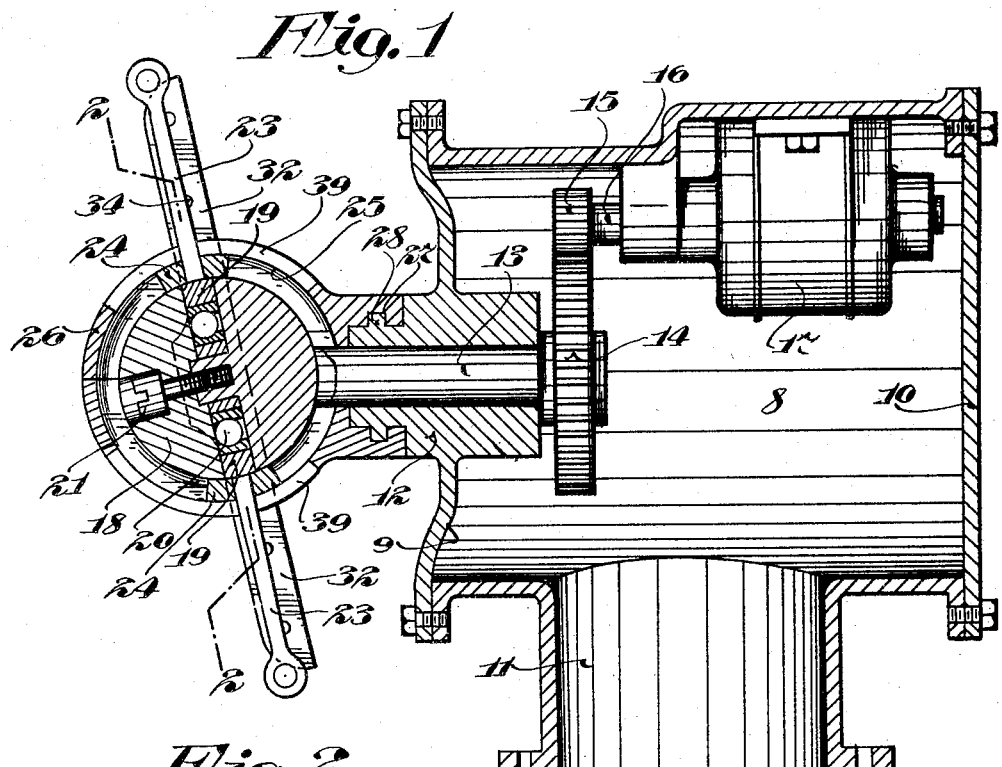
Fig. 1 is a view chiefly in vertical axial section showing the improved vibrating device.

In this particular application of the invention, the running parts are mounted on or in a hollow casing shown as made up of a substantially horizontally disposed shell 8 having heads 9 and 10 and a depending anchoring column 11, which latter is adapted to be rigidly secured by screws, bolts or otherwise, to a fixed support. Journaled in the hub 12 of the head 9 is a short shaft 13 which, at its inner end, is shown as provided with a gear 14 that meshes with a pinion 15 carried by the shaft 16 of the rotor of an electric motor 17, the frame of which is rigidly secured to the top of the shell 8. At its outer end the shaft 13 is provided with a spherical head 18 that is formed with an annular cam-acting groove in which is mounted a vibrator ring 19 that is set in a plane that is oblique to the axis of the shaft 13 and hence is also oblique to a plane to which the axis of said shaft is perpendicular. An anti-friction device, preferably a ball bearing 20, is interposed between the ring 19 and the bottom of the oblique groove of head 18. To facilitate application of the ring 19 and ball bearing 20 in said oblique groove, the ball 18 is made in two semi-spherical sections rigidly secured together by a machine screw 21.

Figures 2, 3:
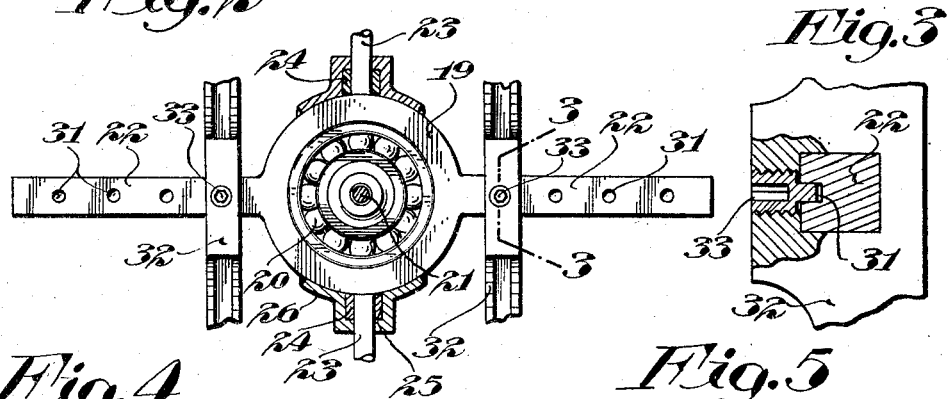
Fig. 2 is a fragmentary view with some parts sectioned on the line 2—2 of Fig. 1.
Fig. 3 is a fragmentary section taken on the line 3—3 of Fig. 2.
Figures 4, 5:
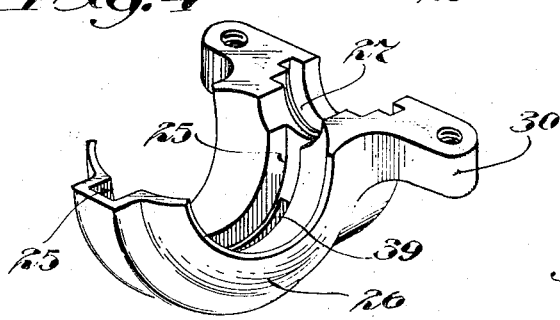
Fig. 4 is a perspective showing one-half of the shoe race bracket.
Fig. 5 is a perspective showing one of the shoes of the vibrator.

A peculiar and novel vibratory movement under rotation of the shaft 13 and head 18 is transmitted or imparted by the ring 19 which is held against rotation and has projecting arms or parts to which straps or the like may be attached for the transmission of the peculiar movement to the human body. As shown, ring 19 is provided with diametrically projecting main arms 22 and with diametrically projecting arms 23, which, as best shown in Fig. 2, are on a line approximately ninety degrees from the line of the arms 22. These arms 23 afford studs on which segmental shoes 24 are pivotally mounted.

The shoes 24 work in annular shoe races 25 formed in segmental shoe race brackets 26. Two of these shoe race brackets are placed together to form a complete annular bracket that closely engages the exterior of a spherical head 18. At their inner extremities, brackets 26 are formed with grooves 27 that embrace the flanged end 28 of hub 12 and interlock therewith under the action of clamping screws 29 applied through lugs 30 on said brackets.

The arms 12, as shown, are square in cross-section and are provided with longitudinally spaced indentations 31. The cross bars 32 are extended crossways of and are adjustably mounted on the arms 22 and are provided with lock screws 33 that are engageable with the indentations 31 to rigidly secure said bars on said arms in desired adjustments. As shown, the bars 32 are channel-shaped in cross-section and are provided with longitudinal spaced screw holes 34 for the application of screws 35 to secure the end links 36 of body straps 37 to the ends of said bars.

Figure 6:
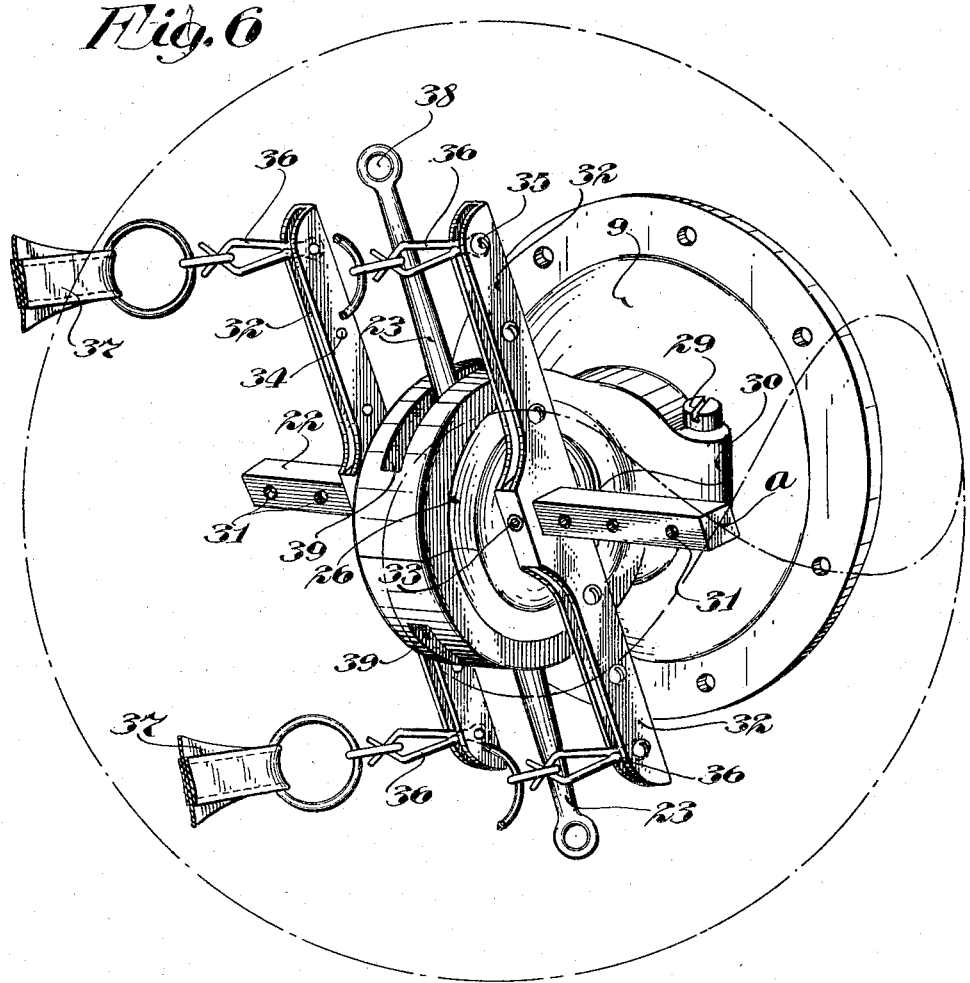
Fig. 6 is a perspective of the movable parts of the vibrator, various peculiar movements produced thereby being indicated diagrammatically by dotted lines.
Figure 7:
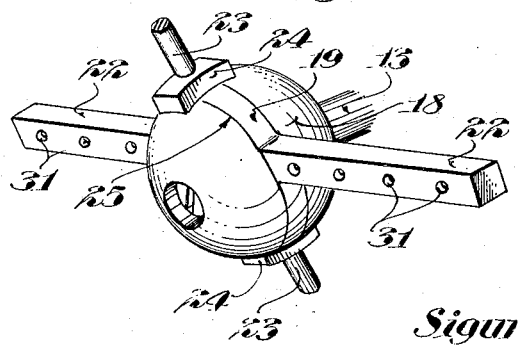
Fig. 7 is a perspective showing the spherical cam-acting vibrator and certain of the immediately connected parts removed from their supports.

So far as the shoe action is concerned, the arms 23 might be very short but they are preferably extended and made long and provided at their outer ends with eyes 38, so that vibratory motion may be taken off the same where desired. As best shown in Figs. 1 and 6, the brackets 26 are provided with segmental slots 39 that permit the free vibratory movement of the arms 23.

Operation

In Fig. 6, the broken dotted line indicating a figure 8 illustrates the movement of the point marked $a$ on the end of the near arm 22. This point $a$ describes a figure 8 of maximum lateral dimension, but any point carried by the line 19 in the plane of the arms 22 and bars 32 will describe a figure 8. The figures 8, however, will be of decreasing lateral dimensions as the describing point approaches the axis of arms 23 in the said plane, and in fact, any point on the axis of arm 23 will describe a simple arc in the plane of the slots 29 although any point on arm 23 eccentric to its axis will describe a slight figure 8 or figure 8 deviation from the true arc. From the above it follows that by adjustments of bars 35 on arms 22 and by adjustments of the links 36 on said bars, a figure 8 of any dimension desired may be described. Moreover, the ends of the body straps 37 may be connected to the bars 32 in various different ways so as to give all sort of different kinds of vibratory and massaging movements to the straps. For instance, the odds and ends of one strap may be connected to corresponding ends of the two bars 32 or to the opposite ends of different bars or to the opposite ends of the same bar. Furthermore, the ends of the strap may be connected to the ends of the arms 23 or to the ends of arms 22.

It is impossible to describe all of the various different kinds of vibratory and massaging movements that may be imparted with this device, for it is evident that they may be produced in ways too numerous for description. It is also, of course, possible to produce in the one body strap one kind of movement and in the other body strap an entirely different kind of vibratory massaging movement so that for the various different kinds of treatments, there is always available any one of numerous different kinds of movements.

In actual practice, the device has been found not only highly efficient but to carry the range of possible vibratory and massaging movements far beyond anything heretofore produced. From the foregoing, it is, of course, evident that the particular device illustrated is capable of a large range of modification within the scope of the invention herein disclosed and broadly claimed.

What I claim is:

1. A vibrator of the kind described comprising a rotary shaft with a head provided with an oblique peripheral groove, a ring member mounted in said groove and provided with a projecting arm, a vibration-transmitting member applied to said arm, and means holding said ring member against rotation of said head but permitting the same to vibrate in a plane that radiates from the axis of said shaft and head, said ring having a motion-projecting arm extended from a plane offset from the means for holding the said ring against rotation and thereby arranged to partake of a figure 8 movement when said head is rotated.

2. A vibrator of the kind described comprising a rotary power-driven shaft provided with a head having an oblique peripheral groove, a ring member mounted in said groove, a shoe pivotally connected to said ring, a bracket surrounding said head and having a segmental slot in a plane that radiates from the axis of said shaft and head, means on said ring working in said segmental slot and holding the same against rotation of said head, but free for vibrations in a plane that radiates from the axis of said head, and an arm projecting from said ring and which arm by the arrangement described will be given substantially a figure 8 movement, and means attached to said arm for transmitting the vibratory movement therefrom to the body of a person.

3. The structure defined in claim 1 in which said ring is provided with diametrically opposite projecting arms of the character described.

4. The structure defined in claim 2 in which said ring is provided with a second arm of the character described projecting diametrically from the opposite direction from the arm first noted.

5. The structure defined in claim 1 in further combination with a cross bar adjustably applied to the arm of said ring member and to which the vibration-transmitting member is directly connected.

6. In a vibrator of the kind described, the combination with a rotary shaft provided with a spherical head having an oblique peripheral groove, of a ring member seated in said groove, a bracket surrounding said head and having a groove that extends in a plane that radiates from the axis of said shaft and head, shoes attached to said ring and working in the groove in said bracket to hold said ring against rotation with said head while permitting the same to vibrate in a plane that radiates from the axis of said head.

7. In a vibrator of the kind described, the combination with a rotary shaft provided with a spherical head having an oblique peripheral groove, of a ring member seated in said groove, a bracket surrounding said head and having a groove that extends in a plane that radiates from the axis of said shaft and head, shoes attached to said ring and working in the groove in said bracket to hold said ring against rotation with said head while permitting the same to vibrate in a plane that radiates from the axis of said head, arms projecting from said ring and arranged to be given a figure 8 movement by the means described, and body-engaging members connected to said arms and arranged to be given vibratory movements thereby.

8. In a vibrator of the kind described, the combination with a rotary shaft provided with a spherical head having an oblique peripheral groove, of a ring member seated in said groove, a bracket surrounding said head and having a groove that extends in a plane that radiates from the axis of said shaft and head, shoes attached to said ring and working in the groove in said bracket to hold said ring against rotation with said head while permitting the same to vibrate in a plane that radiates from the axis of said head, arms projecting from said ring from diametrically opposite sides thereof and arranged to be given a figure 8 movement by the means described, cross bars mounted on said arms, and body-engaging straps directly applied to the ends of said cross bars and arranged to be given vibratory movements thereby 9. In a vibrator of the kind described, the combination with a rotary shaft provided with a spherical head having an oblique peripheral groove, of a ring member seated in said groove, a bracket surrounding said head and having a groove that extends in a plane that radiates from the axis of said shaft and head, shoes attached to said ring and working in the groove in said bracket to hold said ring against rotation with said head while permitting the same to vibrate in a plane that radiates from the axis of said head, arms projecting from said ring from diametrically opposite sides thereof and arranged to be given a figure 8 movement by the means described, cross bars mounted on said arms, and body-engaging straps directly applied to the ends of said cross bars and arranged to be given vibratory movements thereby, said cross bars being independently laterally adjustable on said radial arms.

10. The combination with a rotary member, of a wabbling member having oblique cam-acting engagement with said rotary member, means holding said wabbling member against rotation with said shaft, and an arm-like projection from said wabbling member in a plane offset from the means for holding said wabbling member against rotation and thereby arranged to partake of a figure 8 movement when said rotary member is rotated.

In testimony whereof I affix my signature.

SIGURD M. SWENSEN.